I. H. FRY AND E. HOLLENBACH.
BEARING FOR VEHICLE WHEELS.
APPLICATION FILED JAN. 31, 1921.

1,414,270.  Patented Apr. 25, 1922.

Isaiah H. Fry
and
Edward Hollenbach
INVENTORS

UNITED STATES PATENT OFFICE.

ISAIAH H. FRY AND EDWARD HOLLENBACH, OF PHILADELPHIA, PENNSYLVANIA.

BEARING FOR VEHICLE WHEELS.

1,414,270.

Specification of Letters Patent. Patented Apr. 25, 1922.

Application filed January 31, 1921. Serial No. 441,394.

*To all whom it may concern:*

Be it known that we, ISAIAH H. FRY and EDWARD HOLLENBACH, citizens of the United States, residing at Philadelphia, in the county of Philadelphia and State of Pennsylvania, have invented new and useful Improvements in Bearings for Vehicle Wheels, of which the following is a specification.

This invention has reference to bearings for rotating parts of vehicles and more particularly to bearings for the wheels thereof, the primary object being to provide a bearing for vehicle wheels which permits of ready adjustment and which when accurately adjusted can be rigidly clamped whereby its displacement in use by virtue of inherent shocks and vibrations is rendered impossible.

Another object of our invention is to provide a bearing for vehicle wheels which is of simple, compact, durable and efficient constructions, and one which will effectively prevent the ingress of dirt and moisture to the antifriction parts, whilst at the same time provision is made for the ready assembling and disassembling of said bearing in case of repair or renewal of any of the parts becoming necessary.

With the foregoing objects in view, this invention consists essentially in the novel features of construction, combinations and arrangements of parts hereinafter fully described and more specifically defined by the appended claim.

In the further disclosure of the invention reference is to be had to the accompanying sheet of explanatory drawings, constituting a part of this specification, and in which like characters of reference designate the same or corresponding parts in all the views.

Figure 1:
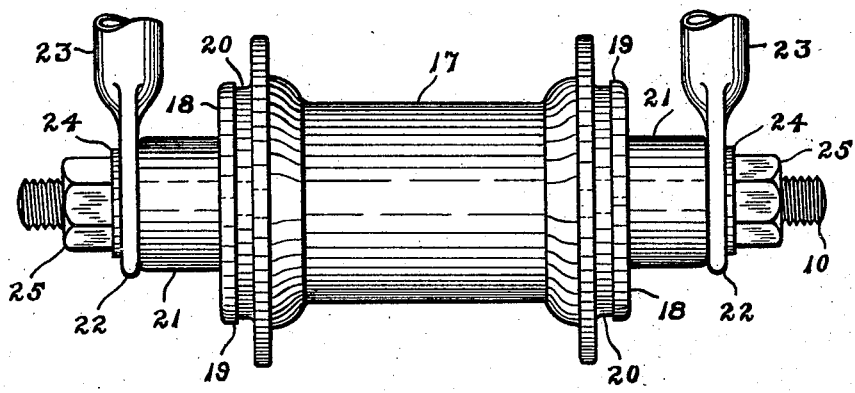
Figure 1 is an elevation of our improved vehicle wheel bearing as adapted more specifically for application to motor cycles.

Referring to the drawings the numeral 10 designates the axle of a motor cycle wheel and on said axle we frictionally fit a tubular shaft or sleeve 11, having reduced end portions 12 providing shoulders 13 against which are secured the inner race members 14 of the ball bearings 15, and the outer race members 16 thereof are rigidly retained in the tubular wheel hub 17. It is to be noted that the inner race members 14 are slightly wider than the outer members 16,—or, a thin washer may be substituted as will be obvious to those acquainted with the art—so that they project beyond the plane of the outer ends of said outer race members for the purpose later on explained, and abutting the inner race members 14 are the dust-caps or washers 18 having peripheral flanges 19 for frictional engagement over the ribs or flanges 20 on the wheel hub 17.

Figure 2:
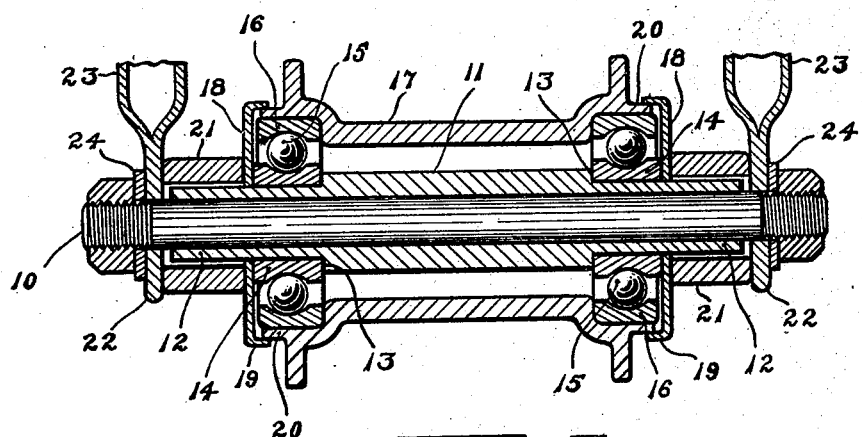
Figure 2 is a longitudinal section through the same.
Figure 3:
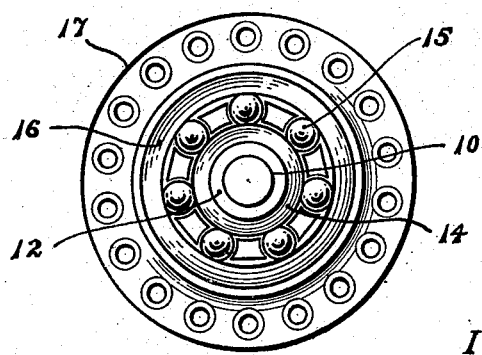
Figure 3 is an end view of the bearing with the dust-cap and outer parts removed.

Concentric with and freely rotatable on the outer ends or reduced parts 12 of the aforesaid tubular shaft 11 are sleeves or collars 21 of a length to project slightly beyond the outer ends of the tubular shaft or sleeve 11 as will be clearly seen on an inspection of Figure 2 more particularly. Snugly fitting the axle 10 are the lower eyed-ends 22 of the wheel supporting forks 23 and said eyed-ends are held firmly in abutment with the sleeves or collars 21 by washers 24 and nuts 25 appropriately threaded on the ends of the axle 10.

From the foregoing description it will be readily seen that by our invention we provide a simple, efficient and reliable vehicle wheel bearing which can be easily adjusted, and when so adjusted remains unaffected by jars and vibrations whereby bearings heretofore usually employed become quickly loosened and deranged. Still further it is to be especially noted that by the use of the shouldered tubular shaft or sleeve 11 and collars 21 an effective means is provided for rigidly clamping the bearing at the requisite adjustment whereby the wheel hub 17 always remains freely rotatable in that no clamping end thrust or diametric frictional resistance are set up thereagainst when the lock nuts 25 are applied. These features which are of the essence of our construction will be readily apparent to anyone acquainted with the art or to persons accustomed to using motor cycles, and whilst we have shown and described the best form thereof at present known to us we wish it clearly understood that we do not limit ourselves to the precise pattern, shape or arrangement of the several parts but consider ourselves at liberty to make such changes and other modifications as fairly fall within the scope of the appended claim.

Having described our invention what we claim as new and desire to secure by Letters Patent is:—

In combination with an axle and supporting means therefor of a sleeve loosely mounted on said axle, reduced portions formed on its outer ends and defining shoulders, a hub surrounding the greater portion of said sleeve and spaced therefrom, the extremities of said hub being enlarged and provided with internal shoulders, said shoulders being in vertical alignment with the shoulders of said sleeve, chambers defined by the space between the enlarged ends of said hub and the reduced extremities of said sleeve, race members positioned within said chambers and bearing against the shoulders of the sleeve and hub respectively, a washer mounted on each reduced portion for holding the adjacent race member in its chamber and embracing said hub, and means for holding said washer in position.

In testimony whereof we affix our signatures.

ISAIAH H. FRY.
EDWARD HOLLENBACH.